United States Patent

[11] 3,581,464

| [72] | Inventors | Pravin G. Bhuta<br>Torrance;<br>Arthur K. Williams, Woodland Hills, both of, Calif. |
|---|---|---|
| [21] | Appl. No. | 784,016 |
| [22] | Filed | Dec. 16, 1968 |
| [45] | Patented | June 1, 1971 |
| [73] | Assignee | TRW Inc.<br>Redondo Beach, Calif. |

[54] METHOD OF AND APPARATUS FOR SEPARATING A LIQUID FROM LIQUID VAPOR AND DISSOLVED GASES
11 Claims, 4 Drawing Figs.

[52] U.S. Cl. .................................................... 55/43,
55/189
[51] Int. Cl. ..................................................... B01d 19/00
[50] Field of Search ........................................ 55/43, 159,
431, 522, 189

[56] References Cited
UNITED STATES PATENTS

| 3,286,463 | 11/1966 | McGroarty | 55/431X |
| 3,486,302 | 12/1969 | Paynter | 55/159 |
| 3,492,793 | 2/1970 | Bhuta et al. | 55/159 |

OTHER REFERENCES

Paynter et al. I, Balzer, Barksdale, Hise, "Development of a Capillary System for a Liquid Propellant Orientation", Martin Co., Denver, Colo. pp. Title, 3, 31 & 32. 1965

Paynter et al. II, Balzer, Barksdale, "Capillary Systems for Storable Propellants", Martin Co., Denver Colo. pp. Title, 3—6, 21, 23 & 33. 1967

*Primary Examiner*—Reuben Friedman
*Assistant Examiner*—R. W. Burks
*Attorneys*—Daniel T. Anderson, Gerald Singer and Alfons Valukonis ABSTRACT: A multistage phase separator for separating the liquid and gaseous phases of an entering fluid by passage of the latter through a number of successive porous capillary phase separation barriers which pass the liquid phase but block passage of vapor and gasses by means of a surface tension screening action. A phase separation method and apparatus for separating a liquid from its vapor and dissolved gases by passage of the liquid through one or more phase separation zones each of which is vented to a reduced pressure region to effect dissolution of the dissolved gases and is followed by a capillary phase separation barrier which blocks the passage of the vapor and gases evolved within the preceeding phase separation zone.

Pravin G. Bhuta
Arthur K. Williams
INVENTORS

METHOD OF AND APPARATUS FOR SEPARATING A LIQUID FROM LIQUID VAPOR AND DISSOLVED GASES

REFERENCE TO COPENDING APPLICATION

Reference is made herein to copending application Ser. No. 690,844, filed Dec. 15, 1967, now U.S. Pat. No. 3,492,793 entitled "Liquid Vapor Separator and Cryogenic Liquid Converter."

BACKGROUND OF THE INVENTION

1. Field of the Invention

This invention relates generally to the field of fluid phase separation. More particularly, the invention relates to a method of and a phase separator for separating a liquid from its vapor as well as from gases dissolved in the liquid.

2. Prior Art

One of the well-known techniques of separating the liquid and gaseous phases of a fluid involves passage of the fluid through a capillary phase separation barrier, such as a micronic screen. This barrier contains pores which are sized to pass the liquid phase but block passage of the gaseous phase when the barrier is wetted by the liquid phase. The mechanics of this phase screening action are well understood in the art and thus need not be elaborated on in this disclosure. Suffice it to say the screening action is a surface tension phenomenon in which each pore exposed to the gaseous phase at the upstream side of the barrier contains a meniscus film of liquid that blocks passage of the gaseous phase so long as the pressure differential across the pore is less than the critical pressure drop required to rupture the film.

SUMMARY OF THE INVENTION

According to one of its important aspects, the present invention provides a surface tension phase separator which is characterized by a highly efficient, multistage phase separation or screening action. The present multistage phase separator has a number of capillary phase separation barriers constructed of micronic screen or other porous material arranged in series within the flow path of fluid through the separator. As a consequence, fluid flowing through the separator is subjected to a number of surface tension phase screening stages which are effective to remove virtually all entrained gas and vapor from the liquid. The phase separation barriers may have a graduated pore size; that is to say, the pore size of the successive barriers in the direction of fluid flow may be progressively reduced. This results in a multistage phase separation action whose efficiency increases from one stage to the next.

Another important aspect of the invention is concerned with separating a liquid from its vapor as well as from gases dissolved in the liquid. According to this aspect, the fluid from which liquid is to be separated is induced to flow through at least one phase separation zone followed by a capillary phase separation barrier, and preferably through a number of successive phase separation zones separated by intervening phase separation barriers. Each phase separation zone is vented to a reduced pressure region to effect dissolution of the dissolved gases from the liquid as the latter passes through the respective zone. The evolved gases and vapor are then screened from the liquid as the latter emerges from the zone through the following phase separation barrier. Preferably, the pressure levels in the successive reduced pressure regions are progressively lowered to maximize dissolution of the dissolved gasses. The effective porous flow areas of the successive phase separation barriers may also be progressively reduced to increase the pressure drops across the barriers and thereby promote further dissolution of the dissolved gases. In order to accomplish maximum dissolution of the dissolved gasses without exceeding the critical pressure drop across each phase separation barrier, the pore size of the barriers may be progressively reduced from one barrier to the next.

In one disclosed embodiment of the invention, the multistage screening and gas dissolution features of the invention are utilized in combination to provide a phase separator characterized by high phase separation efficiency. Another feature of this embodiment resides in the fact that the incoming fluid to be screened is sprayed or jetted directly onto the upstream side of the adjacent phase separation barrier to maintain the latter in a thoroughly wetted condition regardless of the liquid level within the separator.

DESCRIPTION OF THE PREFERRED EMBODIMENTS

Figure 1:
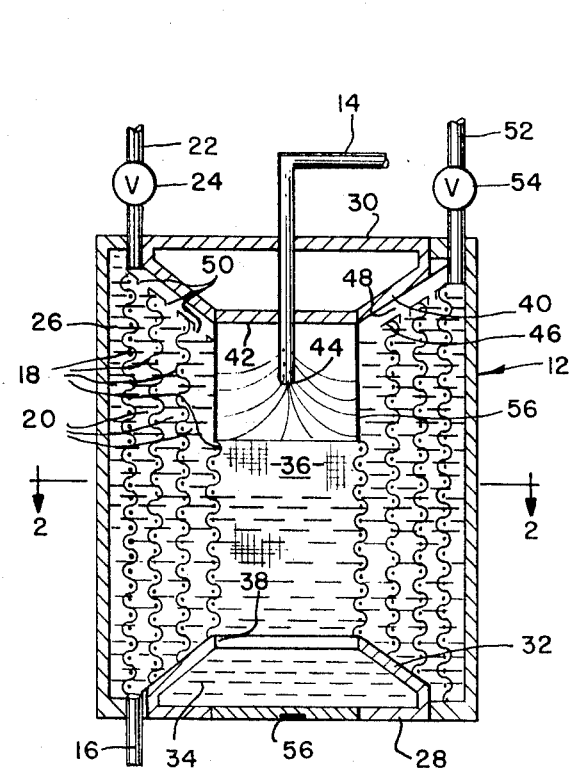
FIG. 1 is a longitudinal section through a multistage phase separation according to the invention.
Figure 2:
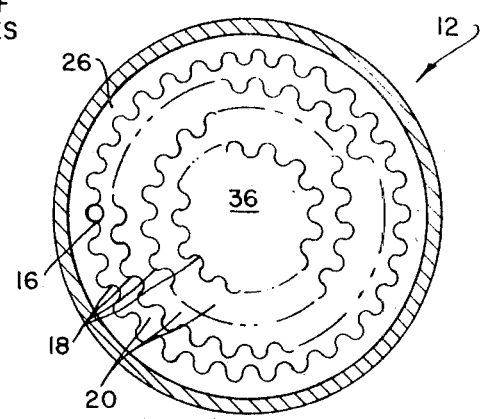
FIG. 2 is a section taken on line 2-2 in FIG. 1.

Turning now to FIGS. 1 and 2 of these drawings, there is illustrated in a multistage phase separator according to the invention for separating the liquid and gaseous phases of an entering fluid. Phase separator 10 has a fluid conduit 12 in the form of a hermetic vessel with an inlet 14 and an outlet 16. Within the vessel 12 are a number of capillary phase separation barriers 18 arranged in series within a flow path between the inlet 14 and outlet 16. Accordingly, fluid entering through the inlet passes through the barriers 18 in succession. Each of these barriers comprises a porous capillary structure, such as a micronic screen, containing capillary pores which are sized to pass the liquid phase of the incoming fluid but not vapor or undissolved gas. According to a feature of the invention, the several phase separation barriers may have a graduated pore size and/or effective porous flow area, such that the pores and/or effective porous flow areas of the successive barriers, in the direction of fluid flow, are progressively reduced in size. However, the invention contemplates within its scope phase separation barriers having the same general pore size and/or effective area.

The adjacent phase separation barriers 18 define therebetween intervening phase separation zones 20. A vent 22 communicates with the upper ends of these zones for venting gas and vapor from the zones during initial filling of the separator with fluid. Vent 22 contains a pressure relief or check valve 24 which opens to vent gasses and vapor from the separation zones. In the event that the fluid being processed is a relatively volatile fluid, such as a cryogen, the outer phase separation barrier 18 may be spaced from the wall of the conduit or vessel 12, according to the teachings of the earlier mentioned copending application Ser. No. 609,844, to define an outer zone 26. This outer zone contains any vapor and gases evolved from the liquid in contact with the wall as a consequence of heat leak through the wall. The outlet 16 opens to the adjacent phase separation zone 18, whereby gas and vapor which is evolved within the outer zone 26, as a result of heat leak through the wall of vessel 12, is prevented from entrainment in the liquid emerging through the outlet.

In the particular embodiment of the invention selected for illustration, the vessel 12 is a cylindrical tank. The present phase separator may have other shapes, of course. The ends of the tank are closed by endwalls 28 and 30. Joined to and rising from the upper side of the lower endwall 28 is an annular wall 32 of generally frustoconical configuration. Walls 28 and 32 define a sludge collection chamber 34. Chamber 34 communicates with the central region 36 of the vessel 12 through an opening 38 in the upper end of the wall 32. Joined to and depending from the underside of the upper endwall 30 of the tank 12 is a wall 40 of central tank region 36. frustoconical configuration. The lower end of this latter wall is closed by a wall portion 42 which defines the upper boundary of the central tank region 36. The tank inlet 14 comprises a conduit which is sealed to and extends downwardly through the upper endwall 30 and the wall portion 42 on the central axis of the tank 12. The lower end of this conduit opens to the central tank region 36. According to a feature of the invention, the lower end of the inlet conduit mounts a spray head or nozzle 44 for reasons to be explained presently.

The capillary phase separation barriers 18 of the illustrated phase separation device 10 comprise cylindrical screens of varying diameters. These screens are concentrically mounted within the tank 12, whereby the adjacent screens are radially spaced to define therebetween the phase separation zones 20. From this description, it will be understood that these zones have an annular cross section in planes normal to the axis of the tank 12. The lower ends of the three innermost screens 18 are brazed or otherwise rigidly joined to the lower conically tapered wall 32. The upper ends of these screens are joined to a conically tapered wall 46 secured to and spaced a distance from the underside of the upper conically tapered wall 40. The walls 40, 46 define an intervening, conically tapered manifold chamber 48. The ends of the outer screen 18 are joined to the tank end walls 28 and 30. The innermost screen 18 surrounds and defines the outer boundary of the inner tank region 36. The outermost screen is radially spaced from the cylindrical sidewall of the tank 12, for the reasons already explained. The tank outlet 16 comprises a conduit which extends through and is sealed to the lower tank wall 28 and opens to the annular phase separation zone 20 between the outer screen and the adjacent inner screen. The tank vent 22 comprises a conduit which extends through and is sealed to the upper tank wall 30 and opens to the manifold chamber 48. This manifold chamber communicates to the upper ends of the phase separation zones 20 through vent ports 50 in the manifold wall 46. A second vent 42, containing a pressure relief or check valve 54, opens to the upper end of the outer zone 26 to vent evolved gasses and vapor from this zone.

The phase separator 10 is conditioned for operation by filling the tank 12 through its inlet 14 with the liquid to be screened. This liquid initially enters the central region 36 of the tank 12 and then flows outwardly from this region through the phase separation screens 18 to fill the annular phase separation zones 20 and the outer annular separator zone 26. During this filling operation, the valves 24 and 54 open to vent air and vapor from the upper ends of these zones. During passage of the liquid from the central tank region 36 to the several separator zones 20 and 26, the phase separation screens 18 act to block the passage of entrained gas and vapor in the liquid. Accordingly, the liquid within the zones is relatively vapor and gas-free.

During normal operation of the phase separator, liquid enters the central separator or tank region 36 through the outlet 14 and then flows radially out through the three inner phase separation screens 18 to the outlet 16. These screens act to block, with a surface tension screening action, passage of entrained gasses and vapor in the liquid. Accordingly, the liquid emerging through the outlet 16 is relatively free of entrained gasses and liquid. It will be recognized that the three inner screens perform a multistage phase screening action which is vastly more efficient than the single-stage phase-screening action that occurs in the existing surface tension phase separators. As a consequence, the liquid emerges from the tank through the outlet 16 in a much more gas and vapor free condition than does the liquid emerging from the existing separators. The relatively high efficiency of the phase separation or screening action of the present multistage separator may be even further improved by utilizing phase separation screens 18 of graduated pore size, as discussed earlier. In this case, the pores in the successive screens, in the direction of flow through the separator, are progressively reduced in size. In this way, each succeeding screen will block the passage of any gasses or vapor which penetrates the preceeding screen. It is also significant to note that the outlet 16 is located below the level of the lower end of the adjacent upstream screen 18 because of the slope of the lower conical wall 32. This aids in preventing entrance into the outlet of any entrained gas or vapor which does penetrate the latter screen.

In addition to separating or screening entrained gasses and vapor from the entering liquid, the inner screen 18 also acts as a filter for removing sludge and other foreign matter from the entering liquid. Assuming that the separator operates in a normally upright position, this foreign material will drop by gravity into the sludge collection chamber 34 from which it may be removed periodically by removing a cleaning plug 56 in the bottom tank wall 28.

As noted earlier, the inner end of the separator inlet conduit 14 mounts a spray head or nozzle 44. If the demand for liquid suddenly increases to such an extent that the liquid in the central region drops to a low level, the nozzle acts to spray the incoming liquid directly onto the upstream side of the inner phase separator screen 18 so as to maintain the latter in a thoroughly wetted condition and thereby preserve its phase separation capability. In this regard, of course, it will be understood by those versed in the art that capillary action will also tend to retain all of the phase separation screens 18 in a thoroughly wetted condition so long as some free liquid exists within the separator. In the event that the incoming liquid emerges from the nozzle at sufficiently high velocity to drive entrained gasses and vapor in the liquid through the screen pores, the inner phase separation barrier 18 may be provided with an imperforate portion or baffle 56 against which liquid sprayed from the nozzle impinges. The liquid then flows downwardly along the baffle to the inner screen proper. An alternative approach to the problem would be to replace the nozzle by a perforate ring or other fitting positioned closely adjacent the inner screen so that the incoming liquid emerging from the fitting would simply flow downwardly along the inner screen.

Figure 3:
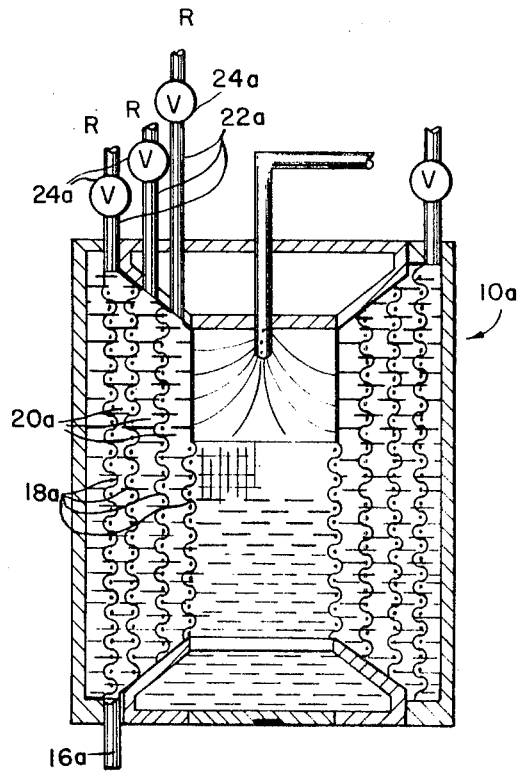
FIG. 3 is a longitudinal section through a modified phase separator according to the invention for separating a liquid from its vapor as well as from a gas dissolved in the liquid.

The phase separator 10, just described, is capable of separating or screening from the incoming liquid only vapor and gasses which is entrained in the liquid, that is liquid which exists in the form of bubbles in the liquid rather than being actually dissolved in the liquid. Turning now to FIG. 3, there is illustrated a modified phase separator 10a according to the invention which is effective to separate from a liquid not only vapor and gasses entrained in the liquid, but also gasses which may be dissolved in the liquid. This modified separator is identical to the phase separator 10 except that the vent conduit 22 and manifold 48 of the latter separator are replaced, in the modified separator 10a, by separate vent conduits 22a, containing pressure relief or vent valves 24a, The inner ends of these vent conduits open to the phase separation zones 20a, respectively. The outer ends of the conduits communicate to reduced pressure regions R. The reduced pressure level existing within each region R is less than the total gas and vapor pressure corresponding to the temperature of the liquid within the respective phase separation zone 20. Preferably, the pressure levels within the successive reduced pressure regions R, in the direction of fluid flow, are progressively reduced.

From this description, it is evident that the phase separator 10a performs the same phase separation screeding action as the earlier described phase separator 10. An additional operating feature of the separator 10a resides in the fact that venting of the phase separation zones 20a to the reduced pressure regions R effects dissolution of the gasses dissolved in the liquid as the latter passes through these zones. The phase separation screen 18a at the downstream side of each phase separation zone blocks the passage of the evolved gasses from the latter zone to the following zone. This gas dissolution and screening action occurs within each of the phase separation zones, whereby the liquid emerging through the separator outlet 16a is relatively free not only of entrained vapor and gasses, but also dissolved gasses.

It is well known by those versed in the art that surface tension phase separation devices of the character described will withstand only a certain maximum or critical pressure drop across each capillary phase separation element, such as the illustrated screens 18, 18a, If this critical pressure drop is exceeded, the meniscus films across the capillary pores will rupture and the pores will pass vapors and gasses as well as liquid.

In the particular embodiment of the invention under discussion, it is desirable to communicate the phase separation zones 20a to reduced pressure regions R whose pressure levels are progressively reduced from one region to the next in the direction of flow so as to effect increased dissolution of dissolved gasses. The effective flow areas of the screens 18a may also be progressively reduced in the direction of flow to increase the pressure drop from one separation zone to the next and thereby further increase dissolution of the dissolved gasses. In order to maximize dissolution of the dissolved gasses in this way without exceeding the critical pressure drop across each screen 18a, the pore size of the screens may be progressively reduced from one screen to the next to increase the maximum or critical pressure drop which each succeeding screen will sustain.

Figure 4:
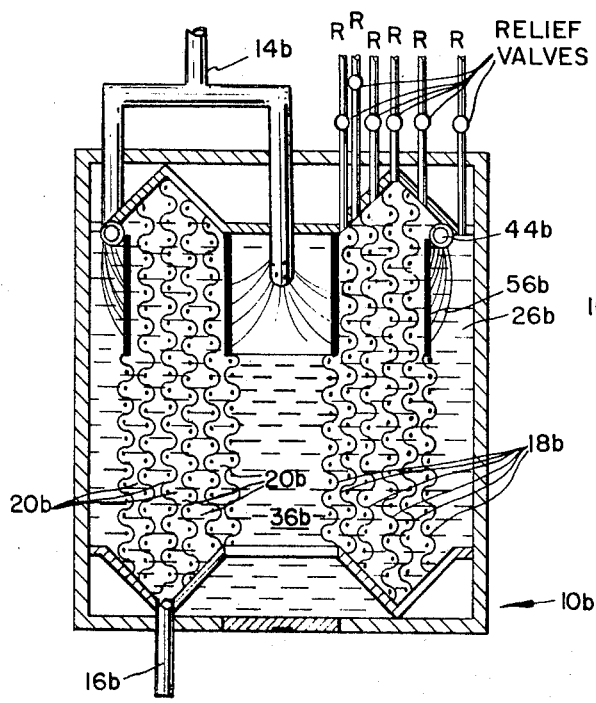
FIG. 4 is a longitudinal section through a further modified phase separator according to the invention.

FIG. 4 illustrates a modified phase separator 10b in which the outlet 16b communicates to the center separation zone 20b and the inlet 14 communicates to both the central region 36b and the outer zone 26b to increase the flow capacity of the separator. In this case the outer end of the inlet conduit may have a nozzle ring 44b which directs the incoming fluid against the adjacent screen 18b. This screen may have an imperforate portion or baffle 56b against which the spray impinges. This modified separator may be otherwise constructed as shown in either FIG. 1 or FIG. 3.

While the invention has been disclosed in what is presently conceived to be its preferred and most practical embodiments, it should be understood that various modifications of the invention are possible within the spirit and scope of the following claims.

I claim:
1. The method of separating a liquid from its vapor and from a gas dissolved in said liquid, which comprises the steps of:
   selecting a phase separator having a liquid inlet, a liquid outlet, a flow path communicating said inlet and outlet, a plurality of surface tension phase separation barriers extending across said flow path in spaced relation along said path so as to define a plurality of successive phase separation zones along said path including an inlet zone opening to said inlet, an outlet zone opening to said outlet, and at least one intervening zone, and said barriers containing capilliary pores communicating the adjacent zones;
   inducing flow of said liquid through said separator in a manner such that the liquid stream enters the separator through said inlet, flows through said zones and barriers in succession, and finally emerges from the separator through said outlet; and
   venting each said zone following said inlet zone during flow of the liquid through said separator to maintain the internal pressure in each said following zone at a level less than the internal pressure in said inlet zone to effect dissolution of said gas from said liquid within the respective zone and thereby separation of said liquid from said vapor and evolved gas during subsequent passage of the liquid through the following barrier.

2. The phase separation method according to claim 1, wherein:
   the internal pressure in each said following zone is less than the internal pressure in the preceeding zone.

3. The phase separation method according to claim 1, wherein:
   said following zone pressures are substantially equal.

4. A multistage phase separator for separating a liquid from its vapor and a gas dissolved in the liquid, comprising:
   a conduit through which said liquid is adapted to flow having a liquid inlet, a liquid outlet, and a flow path communicating to said inlet and outlet;
   a number of surface tension phase separation barriers extending across said flow path at positions spaced along said flow path and defining a plurality of successive phase separation zones along said path including an inlet zone opening to said inlet, an outlet zone opening to said outlet, and at least one intervening zone;
   said barriers containing capillary pores communicating the adjacent zones; and
   vent means communicating with the zones following said inlet zone including pressure-responsive vent valve means for venting said following chambers during flow of said liquid through said separator to maintain the internal pressure within each said following zone at a level less than the pressure in said inlet zone to effect dissolution of said gas from said liquid within the respective zone and thereby separation of said liquid from said vapor and evolved gas during subsequent passage of the liquid through the following barrier.

5. A phase separator according to claim 4 wherein:
   said vent means comprises a common vent passage and vent valve for venting all of said following zones to maintain the internal pressure in said following zones at substantially the same level less than said inlet zone pressure.

6. A phase separator according to claim 4, wherein:
   said vent means comprise separate vent passages and vent valves for venting each said following zone separately to maintain the internal pressure in each latter zone at a level less than the preceeding zone.

7. A phase separator according to claim 4, wherein:
   said pores are progressively reduced in size from one barrier to the next in the direction of flow.

8. A phase separator according to claim 4, wherein:
   said inlet includes means for discharging the entering liquid directly onto the upstream barrier.

9. A phase separator according to claim 4, wherein:
   said conduit comprises a hermetic vessel;
   said barriers comprise concentric cylindrical, radially spaced surface tension screens within said vessel; and
   said inlet zone is located within the inner screen and said outlet zone is located about the outer screen.

10. A phase separator according to claim 4, wherein:
    said conduit comprises a hermetic vessel;
    said barriers comprise concentric cylindrical radially spaced surface tension screens within said vessel; and
    said inlet zone is located within the inner screen and about the outer screen, and said outlet zone is located between two adjacent screens.

11. A phase separator according to claim 10, including:
    means for discharging the liquid entering through said inlet directly onto both the inner and outer barriers.

UNITED STATES PATENT OFFICE
CERTIFICATE OF CORRECTION

Patent No. 3,581,464     Dated June 1, 1971

Inventor(s) Pravin G. Bhuta/Arthur K. Williams

It is certified that error appears in the above-identified patent and that said Letters Patent are hereby corrected as shown below:

Col. 2, line 51     "609,844" should read -- 690,844 --.

Signed and sealed this 29th day of October 1974.

(SEAL)
Attest:

McCOY M. GIBSON JR.  
Attesting Officer

C. MARSHALL DANN  
Commissioner of Patents